(12) United States Patent
Yu et al.

(10) Patent No.: US 10,055,406 B2
(45) Date of Patent: Aug. 21, 2018

(54) SERVER, USER TERMINAL, AND METHOD FOR CONTROLLING SERVER AND USER TERMINAL

(71) Applicant: SAMSUNG ELECTRONICS CO., LTD., Suwon-si, Gyeonggi-do (KR)

(72) Inventors: Ji-sang Yu, Seoul (KR); Jin-sik Lee, Suwon-si (KR); Sang-ha Kim, Seoul (KR); Eun-kyoung Kim, Suwon-si (KR); Dong-hyeon Lee, Suwon-si (KR); Jae-won Lee, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/012,206

(22) Filed: Feb. 1, 2016

(65) Prior Publication Data

US 2017/0068661 A1 Mar. 9, 2017

(30) Foreign Application Priority Data

Sep. 8, 2015 (KR) .................... 10-2015-0126986

(51) Int. Cl.
G06F 17/28 (2006.01)
H04N 21/00 (2011.01)
G06F 17/00 (2006.01)
G06F 17/24 (2006.01)

(52) U.S. Cl.
CPC .......... G06F 17/289 (2013.01); G06F 17/241 (2013.01)

(58) Field of Classification Search
CPC .................................................. G06F 17/289
See application file for complete search history.

(56) References Cited

U.S. PATENT DOCUMENTS

| 5,200,893 | A | * | 4/1993 | Ozawa | G06F 17/243 |
| | | | | | 715/235 |
| 5,442,547 | A | * | 8/1995 | Kutsumi | G06F 17/2795 |
| | | | | | 704/2 |
| 5,475,586 | A | * | 12/1995 | Sata | G06F 17/271 |
| | | | | | 704/2 |
| 5,677,835 | A | * | 10/1997 | Carbonell | G06F 17/21 |
| | | | | | 704/8 |

(Continued)

FOREIGN PATENT DOCUMENTS

| JP | 2008-243222 | 10/2008 |
| JP | 2011-248827 | 12/2011 |

(Continued)

OTHER PUBLICATIONS

Search Report and Written Opinion dated Jun. 8, 2016 in counterpart International Patent Application No. PCT/KR2016/001168.

*Primary Examiner* — Fariba Sirjani
(74) *Attorney, Agent, or Firm* — Nixon & Vanderhye P.C.

(57) ABSTRACT

A server, a user terminal, and a method for controlling the server and the user terminal are provided. The server controlling method includes receiving a text from a user terminal, translating the received text to generate a translated text, extracting at least one core word from the translated text, obtaining image information corresponding to the at least one core word with respect to each of the at least one core word, and transmitting the translated text and the extracted image information to the user terminal.

8 Claims, 16 Drawing Sheets

(56) References Cited

U.S. PATENT DOCUMENTS

| | | | | |
|---|---|---|---|---|
| 5,842,159 A * | 11/1998 | Nakamura | G06F 17/2863 | 704/10 |
| 5,995,920 A * | 11/1999 | Carbonell | G06F 17/21 | 704/9 |
| 6,022,222 A * | 2/2000 | Guinan | G09B 5/065 | 345/473 |
| 6,041,293 A * | 3/2000 | Shibata | G06F 17/2818 | 704/4 |
| 6,233,544 B1 * | 5/2001 | Alshawi | G06F 17/2818 | 704/2 |
| 6,275,789 B1 * | 8/2001 | Moser | G06F 17/271 | 704/2 |
| 6,470,306 B1 * | 10/2002 | Pringle | G06F 17/241 | 704/3 |
| 7,146,358 B1 * | 12/2006 | Gravano | G06F 17/30864 | |
| 7,346,487 B2 * | 3/2008 | Li | G06F 17/2735 | 704/10 |
| 7,539,619 B1 * | 5/2009 | Seligman | G06F 17/2755 | 704/2 |
| 7,725,408 B2 * | 5/2010 | Lee | G06F 17/2818 | 706/12 |
| 7,765,098 B2 * | 7/2010 | Bradford | G06F 17/2809 | 704/2 |
| 8,051,061 B2 * | 11/2011 | Niu | G06F 17/30669 | 704/1 |
| 8,719,003 B1 * | 5/2014 | Chen | G06F 17/2827 | 704/2 |
| 8,874,429 B1 * | 10/2014 | Crosley | G06F 17/289 | 348/14.08 |
| 8,959,011 B2 * | 2/2015 | Anisimovich | G06F 17/2854 | 704/2 |
| 2001/0003214 A1 * | 6/2001 | Shastri | G06F 17/30796 | 725/109 |
| 2004/0008277 A1 * | 1/2004 | Nagaishi | G06K 9/3266 | 348/468 |
| 2006/0293874 A1 * | 12/2006 | Zhang | G06F 17/289 | 704/2 |
| 2007/0033003 A1 * | 2/2007 | Morris | G10L 15/04 | 704/9 |
| 2007/0055695 A1 * | 3/2007 | Dorai | G06F 17/30796 | |
| 2007/0150256 A1 * | 6/2007 | Lee | G06F 17/2863 | 704/2 |
| 2008/0059526 A1 * | 3/2008 | Murakoshi | G06F 17/30793 | |
| 2008/0212932 A1 * | 9/2008 | Lee | G11B 27/11 | 386/241 |
| 2008/0316305 A1 * | 12/2008 | Ritchie | G06F 3/002 | 348/61 |
| 2009/0058860 A1 * | 3/2009 | Fong | G06F 17/211 | 345/467 |
| 2009/0132233 A1 * | 5/2009 | Etzioni | G06F 17/28 | 704/3 |
| 2009/0271177 A1 * | 10/2009 | Menezes | G06F 17/2818 | 704/2 |
| 2009/0276396 A1 * | 11/2009 | Gorman | G06F 17/2785 | |
| 2010/0121630 A1 * | 5/2010 | Mende | G06F 17/2785 | 704/7 |
| 2010/0223047 A1 * | 9/2010 | Christ | G06F 17/276 | 704/4 |
| 2010/0251291 A1 * | 9/2010 | Pino, Jr. | H04N 5/445 | 725/34 |
| 2010/0291968 A1 * | 11/2010 | Ander | G09B 21/009 | 455/556.1 |
| 2011/0047149 A1 * | 2/2011 | Vaananen | G06F 17/30672 | 707/723 |
| 2011/0064318 A1 * | 3/2011 | Gao | G06F 17/30781 | 382/224 |
| 2011/0166850 A1 * | 7/2011 | Achtermann | G06K 9/6224 | 704/9 |
| 2012/0072202 A1 * | 3/2012 | Chiu | G06F 17/2827 | 704/2 |
| 2012/0232884 A1 * | 9/2012 | Nasukawa | G06F 17/2809 | 704/8 |
| 2012/0271828 A1 * | 10/2012 | Raghunath | G06F 17/2818 | 707/739 |
| 2012/0274850 A1 * | 11/2012 | Hawkins | H04N 21/4307 | 348/515 |
| 2012/0275761 A1 * | 11/2012 | Li | H04N 9/80 | 386/239 |
| 2013/0188886 A1 * | 7/2013 | Petrou | G06F 3/048 | 382/305 |
| 2014/0019113 A1 * | 1/2014 | Wu | G06F 17/2735 | 704/2 |
| 2014/0039873 A1 * | 2/2014 | Li | G06F 17/2854 | 704/2 |
| 2014/0093846 A1 * | 4/2014 | Bird | A63F 9/0098 | 434/167 |
| 2014/0100844 A1 * | 4/2014 | Stieglitz | G06F 17/289 | 704/3 |
| 2014/0156256 A1 * | 6/2014 | Kim | G06F 17/289 | 704/2 |
| 2014/0188834 A1 * | 7/2014 | Guo | G06F 17/30787 | 707/706 |
| 2014/0282030 A1 * | 9/2014 | Bhatnagar | G06F 3/0484 | 715/738 |
| 2014/0344718 A1 * | 11/2014 | Rapaport | H04L 51/32 | 715/753 |
| 2015/0057992 A1 * | 2/2015 | Danielyan | G06F 17/271 | 704/2 |
| 2015/0063696 A1 * | 3/2015 | Chen | G06K 9/00087 | 382/173 |
| 2015/0100981 A1 * | 4/2015 | Gao | H04N 21/435 | 725/32 |
| 2015/0235567 A1 * | 8/2015 | Dohring | G09B 19/06 | 434/157 |
| 2015/0317304 A1 * | 11/2015 | An | G11B 27/036 | 386/285 |
| 2015/0331886 A1 * | 11/2015 | Chen | G06F 17/30014 | 382/175 |
| 2015/0347399 A1 * | 12/2015 | Aue | G06F 17/289 | 704/2 |
| 2015/0365716 A1 * | 12/2015 | Fonseca, Jr. | H04N 5/44543 | 725/41 |
| 2016/0103900 A1 * | 4/2016 | Angelov | G06F 17/30675 | 707/602 |
| 2016/0125274 A1 * | 5/2016 | Zhou | G06K 9/66 | 382/160 |
| 2016/0140113 A1 * | 5/2016 | Shen | H04N 21/4884 | 704/3 |
| 2016/0147746 A1 * | 5/2016 | Park | G06F 17/289 | 704/7 |
| 2016/0154885 A1 * | 6/2016 | Mathieu | G06F 17/30442 | 707/706 |
| 2016/0155357 A1 * | 6/2016 | Chan | G09B 5/06 | 434/157 |
| 2016/0173926 A1 * | 6/2016 | Abed | H04N 7/0882 | 725/28 |
| 2016/0267078 A1 * | 9/2016 | Morehead | G06F 17/2872 | |
| 2016/0306885 A1 * | 10/2016 | Tao | G06F 17/30864 | |

FOREIGN PATENT DOCUMENTS

| | | |
|---|---|---|
| JP | 2012-243060 | 12/2012 |
| KR | 10-2007-0060862 | 6/2007 |
| KR | 10-2013-0088575 | 8/2013 |
| KR | 10-2014-0049150 | 4/2014 |
| KR | 10-2014-0072670 | 6/2014 |
| WO | 2004/049110 | 6/2004 |

* cited by examiner

FIG. 3

| src | Trg ( TRANSLATION RESULT ) |
|---|---|
| 나는 지금 배가 고픈 것 같아<br>(WHICH MEANS THAT I THINK I AM HUNGRY NOW) | Now I think ship and land 〜325 |
| 밥을 많이 먹어서 배가 부르다<br>(WHICH MEANS THAT I AM FULL BECAUSE I EAT A LOT OF RICE) | Eat a lot of rice doubled sing 〜335 |
| 숙소로 가는 길을 알려줘<br>(WHICH MEANS THAT SHOW ME THE WAY TO HOME) | You need to give way to the hotel |
| 식사 거리를 구해줘 〜340   345〜 | Help me to eat away |
| (WHICH MEANS THAT FIND A MEAL) | |
| 김치찌개가 짜다 〜350<br>(WHICH MEANS THAT KIMCHI STEW IS SALTY) | The kimchi stew weave 〜355 |
| 고장난 형광등을 갈다 〜360<br>(WHICH MEANS THAT FAULTY FLUORES IS CHANGED) | Grind the faulty fluores |

| BEFORE CORRECTION | | AFTER CORRECTION | |
|---|---|---|---|
| src | trg | src | trg |
| 결제 올립니다 (WHICH MEANS ASK PAYMENT) —410 | Raise payment —415 | 결재 올립니다 (WHICH MEANS ASK APPROVAL) —420 | Raise approval —425 |
| 저 물건이 더 낳아 (WHICH MEANS THAT STUFF IS BETTER) —430 | That stuff is laid more —435 | 저 물건이 더 나아 (WHICH MEANS THAT THAT STUFF IS BETTER) —440 | That stuff is better —445 |
| 저 스커트는 문안하다 (WHICH MEANS THAT SKIRT IS NOT BAD) —450 | That skirt is editorial —455 | 저 스커트는 무난하다 (WHICH MEANS THAT THAT SKIRT IS NOT BAD) —460 | That skirt is solid —465 |
| 친구랑 연예 하는 중이야 (WHICH MEANS I AM TRYING TO DATING WITH FRIEND) —470 | I'm trying to entertainment with a friend. —475 | 친구랑 연애 하는 중이야 (WHICH MEANS THAT I AM TRYING TO DATING WITH FRIEND) —480 | I'm trying to love with a friend —485 |

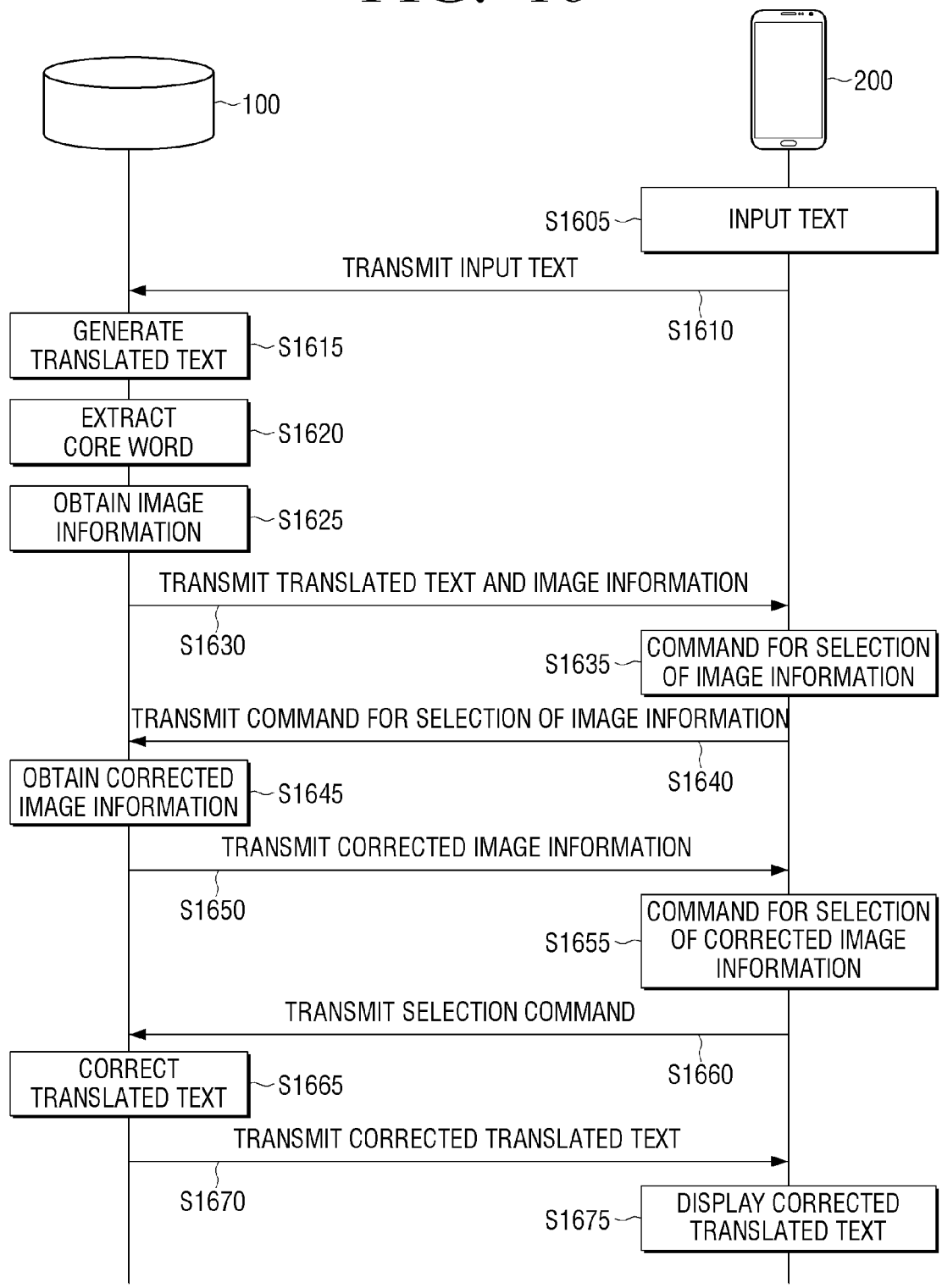

SERVER, USER TERMINAL, AND METHOD FOR CONTROLLING SERVER AND USER TERMINAL

CROSS-REFERENCE TO RELATED APPLICATION

This application is based on and claims priority under 35 U.S.C. § 119 to Korean Patent Application No. 10-2015-0126986, filed on Sep. 8, 2015, in the Korean Intellectual Property Office, the disclosure of which is incorporated by reference herein in its entirety.

BACKGROUND

Field

Apparatuses and methods of the disclosure relate generally to a server, a user terminal, and a method for controlling the server and the user terminal, and for example, to a server, a user terminal, and a method for controlling the server and the user terminal, to provide translated text and image information corresponding to a core word of the translated text.

Description of Related Art

Most conventional translation technologies use a method for conversion into a target language through a decoder in charge of translation of an input original language and outputting the converted target language through a text, a complex sound, and so on. In the case of such a method, when an original language is translated into a target language that a user does not know, the user has a difficulty determining whether the translation is accurate.

In order to overcome the difficulty, a method for translating a result obtained via translation into a target language into an original language, referred to as reverse translation, so as to allow a user to check whether a sentence is mistranslated has been provided. However, the possibility that translation errors accumulate during translation/reverse translation is high, and thus the accuracy of translation is not high.

Accordingly, there has been a need to allow a user who does not know how to intuitively recognize whether an original language is accurately translated into a target language and to correct the translation for enhancing accuracy.

SUMMARY

Example embodiments of the disclosure are provided to address the above disadvantages and other disadvantages not described above.

The disclosure provides a server, a user terminal, and a method for controlling the server and the user terminal, for extracting a core word of a translated text and displaying the translated text together an image corresponding to the core word so as to provide a correctable translated text.

According to an example of the disclosure, a method for controlling a server includes receiving text from a user terminal, translating the received text to generate a translated text, extracting at least one core word from the translated text, obtaining image information corresponding to the at least one core word with respect to each of the at least one core word, and transmitting the translated text and the obtained image information to the user terminal.

The method may further include, in response to a command for correction of the image information being received, transmitting at least one corrected image information item for replacing at least one obtained image information.

The method may further include, in response to a command for selection of the corrected image information being received, correcting the translated text based on the selected corrected image information, and transmitting the corrected translated text.

The extracting of the core word may include extracting a word from at least one of a homonym dictionary and a similar pronunciation dictionary as a core word.

The at least one corrected image information item may correspond to at least one of a homonym and a similarly pronounced word of a core word indicated by the selected image information.

The extracting of the core word may include determining a relation degree between the core word and a plurality of image information items, and obtaining image information with a highest relation degree as image information corresponding to the core word.

The image information may include at least one of an image, a video, and an icon.

According to another example of the disclosure, a server includes a communicator (e.g., including communication circuitry) configured to communicate with a user terminal, and a controller configured to control the communicator to receive text from the user terminal, to translate the received text to generate a translated text, to extract at least one core word from the translated text, to obtain image information corresponding to the at least one core word with respect to each of the at least one core word, and to control the communicator to transmit the translated text and the extracted image information to the user terminal.

In response to a command for correction of the image information being received, the controller may be configured to control the communicator to transmit at least one corrected image information item for replacing at least one obtained image information.

In response to a command for selection of the corrected image information being received, the controller may be configured to control the communicator to correct the translated text based on the selected corrected image information and to transmit the corrected translated text.

The controller may be configured to extract a word from at least one of a homonym dictionary and a similar pronunciation dictionary as a core word.

The at least one corrected image information item may correspond to at least one of a homonym and a similarly pronounced word of a core word indicated by the selected image information.

The controller may be configured to determine a relation degree between the core word and a plurality of image information items and to obtain image information with a highest relation degree as image information corresponding to the core word.

The image information may include at least one of an image, a video, and an icon.

According to another example of the disclosure, a method for controlling a user terminal includes inputting text, transmitting the input text to a server, receiving a translated text and image information corresponding to a core word of the translated text from the server, and displaying the received translated text and the image information.

The inputting of the text may include inputting a voice, recognizing voice, and converting the recognized voice into text.

The method may further include, in response to a command for correction of image information, transmitting the command for correction to the server, receiving at least one corrected image information item for replacing at least one obtained image information from the server, and displaying the received at least one corrected image information item.

The method may further include, in response to a command for selection of one of the at least one corrected image information item being input, transmitting the command for selection to the server, receiving a corrected translated text based on the selected corrected image information from the server, and displaying the received corrected translated text and the selected corrected image information.

The displaying may include displaying the translated text to be symmetrical with the input text and the image information.

According to another example of the disclosure, a user terminal includes an inputter (e.g., including input circuitry) configured to input text, a communicator (e.g., including communication circuitry) configured to communicate with a server, a display, and a controller configured to control the communicator to transmit the input text to the server and to receive a translated text and image information corresponding to a core word of the translated text from the server and to control the display to display the received translated text and the image information.

The controller may be configured to control the inputter to input voice, recognize the voice, and to convert the recognized voice into text.

In response to a command for correction of image information being input, the controller may be configured to control the communicator to transmit the command for correction to the server and to receive at least one corrected image information item for replacing at least one image information from the server and to control the display to display the received at least one corrected image information.

In response to a command for selection of one of the at least one corrected image information item being input, the controller may be configured to control the communicator to transmit the command for selection to the server and to receive a corrected translated text based on corrected image information selected based on the command for selection from the server and to control the display to display the received corrected translated text and the selected corrected image information.

The controller may be configured to control the display to display the translated text to be symmetrical with the input text and the image information.

According to the various example embodiments of the disclosure, a user terminal may provide more accurate translation to a user.

Additional and/or other aspects and advantages of the invention will be set forth in part in the detailed description which follows and, in part, will be apparent from the description.

BRIEF DESCRIPTION OF THE DRAWINGS

The above and/or other aspects of the disclosure will be more apparent from the following detailed description, taken in conjunction with the accompanying drawings, in which like reference numerals refer to like elements, and wherein:

FIG. 3 is a diagram illustrating an example of mistranslation due to confusion between homonyms;

FIG. 4 is a diagram illustrating an explanation of confusion between similarly pronounced words;

FIG. 16 is a sequence diagram illustrating example operation of an example system.

DETAILED DESCRIPTION

Figure 1:
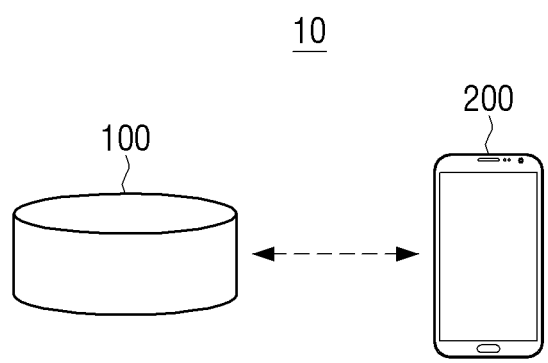
FIG. 1 is a diagram illustrating an example system including a server and a user terminal.

The terms used in description will be described and then example embodiments of the disclosure will be described in greater detail.

Most of the terms used herein are general terms that have been widely used in the technical art to which the disclosure pertains. However, some of the terms used herein may be created reflecting intentions of technicians in this art, precedents, or new technologies. Some of the terms used herein may be arbitrarily chosen. In this case, these terms are defined in greater detail below. Accordingly, the specific terms used herein should be understood based on the unique meanings thereof and the entire context of the disclosure.

The example embodiments of the disclosure may be diversely modified. Accordingly, specific example embodiments are illustrated in the drawings and are described in greater detail in the following detailed description. However, it is to be understood that the disclosure is not limited to a specific example embodiment, but includes all modifications, equivalents, and substitutions without departing from the scope and spirit of the disclosure. Also, well-known functions or constructions are not described in detail since they may obscure the disclosure with unnecessary detail.

It will be understood that, although the terms first, second, third etc. may be used herein to describe various elements, these elements should not be limited by these terms. These terms are only used to distinguish one element from another element. For example, a first element may be termed a second element and a second element may be termed a first element without departing from the teachings of the disclosure. As used herein, the term "and/or" includes any and all combinations of one or more of the associated listed items As used herein, the singular forms "a," "an" and "the" are intended to include the plural forms as well, unless the context clearly indicates otherwise.

Terms such as "include" or "comprise" may be construed to denote a certain characteristic, number, step, operation, constituent element, or a combination thereof, but may not be construed to exclude the existence of or a possibility of addition of one or more other characteristics, numbers, steps, operations, constituent elements, or combinations thereof.

Terms, such as 'unit' or 'module', etc., should be understood as a unit that processes at least one function or operation and that may be embodied in a hardware manner (e.g., circuitry), a software manner, or a combination of the hardware manner and the software manner. In addition, a plurality of 'modules' or a plurality of 'units' may be integrated into at least one module to be embodied as at least one processor except for a 'module' or a 'unit' that needs to be embodied as specific hardware.

In the examples of the disclosure, when it is described that a certain part is "connected" to another part, it should be understood that the certain part may be directly connected to another part or electrically connected to another part via another interposed part.

In the examples of the disclosure, input may include at least one of touch input, bending input, voice input, button input, and multimodal input, or the like, but may not be limited thereto.

In addition, in the examples of the disclosure, the term "application" may refer, for example, to a series of computer program sets that are created for performing a specific function. In the examples of the disclosure, there may be various applications. Examples of the application may include a game application, a video reproducing application, a map application, a memo application, a calendar application, a phone book application, broadcast application, an exercise support application, a payment application, a picture folder application, and so on, but are not limited thereto.

Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, examples of the disclosure will be described with reference to the drawings. FIG. 1 is a diagram illustrating an example translation system 10. As illustrated in FIG. 1, the translation system 10 may include a server 100 and a user terminal 200. Although one user terminal 200 is illustrated the disclosure is not limited thereto. In addition, the user terminal 200 may be embodied as various electronic apparatuses such as, for example, a smart phone, a smart watch, a tablet personal computer (PC), and a notebook PC, or the like.

The user terminal 200 may receive an original text and display the original text together a translated text and image information corresponding to a core word of the translated text based on the received original text. For example, in response to a command requesting correction of the translated text using the image information being input to the user terminal 200, the user terminal 200 may display at least one corrected image information item to replace the image information. In addition, in response to a command requesting selection of the corrected image information being input to the user terminal 200, the user terminal 200 may display a corrected translated text based on the corrected image information.

For example, the user terminal 200 may receive the original text. In response to the original text being input as a voice, the user terminal 200 may convert the received voice into text and transmit the original text to the server 100.

In response to the original text being received, the server 100 may transmit the original text to generate the translated text. For example, the server 100 may translate the received original text into a target language to generate the translated text using, for example, a machine translation decoder.

In addition, the server 100 may extract a core word from the translated text. The core word may, for example, be a noun, a predicate, or the like. For example, the server 100 may extract a word corresponding to a homonym or a similarly pronounced word among words contained in the translated text as the core word.

The server 100 may obtain image information items corresponding to respective extracted core words. The image information may include, for example, an icon, a photo, a picture, a video, or a captured image of a video. In addition, the server 100 may transmit the translated text and image information corresponding to the core word of the translated text.

In response to the translated text and the image information corresponding to the core word of the translated text being received, the user terminal 200 may display the translated text and the image information together. In addition, in response to a command requesting selection of the image information being received in order to correct the translated text, the user terminal 200 may transmit the command for selection of the image information to the server 100.

In response to the command for selection of the image information being received, the server 100 may extract at least one corrected image information item to replace the selected image information. The corrected image information may be image information corresponding to a homonym or a similarly pronounced word of a core word corresponding to the selected image information. In addition, the server 100 may transmit the extracted at least one image information item to the user terminal 200.

In response to the at least one corrected image information item being received, the user terminal 200 may display a user interface (UI) including at least one corrected image information item in order to receive the command for selection of the corrected image information. The user terminal 200 may display the corrected image information together with a UI element for determination of a word (e.g., a proper noun) which is not necessary to be translated. In addition, in response to the command for selection of the corrected image information being input to the user terminal 200, the user terminal 200 may transmit the selected corrected image information to the server 100.

In response to the selected corrected image information being received, the server 100 may correct the translated text based on the selected corrected image information. In response to the command for selection of the UI element for determination of a word, which is not necessary to be translated, being input to the server 100, the server 100 may determine a corresponding word as a proper noun and correct the input text. The server 100 may transmit the corrected translated text to the user terminal 200.

When corrected translated text is received, the user terminal 200 may display the corrected translated text and the corrected image information together.

Figure 2:
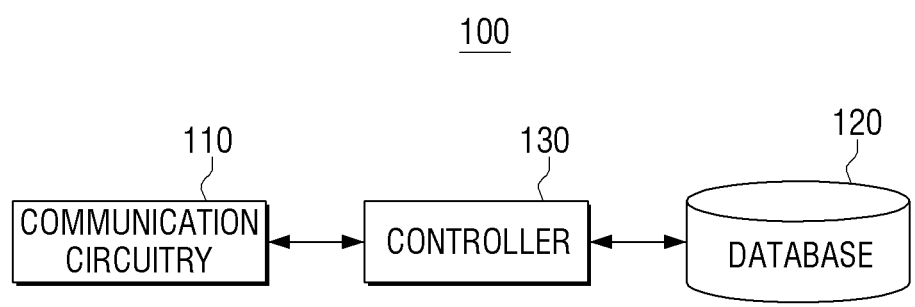
FIG. 2 is a diagram illustrating an example configuration of a server.

FIG. 2 is a diagram illustrating an example configuration of the server 100. As illustrated in FIG. 2, the server 100 may include, for example, a communicator (e.g., including communication circuitry) 110, a database 120, and a controller 130.

The communicator 110 may be configured to communicate with an external apparatus. For example, the communicator 110 may receive an original text and a command from the user terminal 200. The communicator 110 may be configured to transmit a translated text, image information corresponding to a core word of the translated text, and a corrected translated text to the user terminal 200.

The database 120 may, for example, store various data items in order to translate an original text, to extract the core word of the translated text, or obtain image information corresponding to the extracted core word. For example, the database 120 may store information about a homonym and a similarly pronounced word in order to extract the core word of the translated text. The database 120 may, for example, match and store the core word and the image information.

The controller 130 may be configured to control an overall operation of the server 100. For example, the controller 130 may be configured to extract the core word of the translated text and to extract the image information corresponding to the core word. In response to a command for correction of an error of the translated text being received, the controller 130 may be configured to extract the corrected image information to replace the image information.

For example, the controller 130 may be configured to control the communicator 110 to receive the original text. The controller 130 may be configured to translate the received original text to generate the translated text. For example, the controller 130 may be configured to translate the received original text into a target language to generate the translated text. According to an example embodiment of the disclosure, the controller 130 may be configured to translate the received original text based on a parameter value of a translation model to generate the translated text. When the controller 130 performs phrase-based machine translation, the controller 130 may, for example, be configured to derive a parameter value of a translation model using a decoder phrase table.

According to an example embodiment, the controller 130 may be configured to translate the same original text into different meanings based on an existing user log. For example, in response to "공항에서 신고할 내용이 없습니다" (which means that "There is nothing to report at the airport") being received through the communicator 110, the controller 130 may be configured to translate the original text into "There is nothing to report at the airport" in the case of a general domain, into "There is nothing to declare" in the case of an airport domain, and into "There is nothing to call at the airport" in the case of a call domain.

In addition, the controller 130 may be configured to extract at least one core word from the translated text. The controller 130 may be configured to extract a noun and a predicate, which are contained in the translated text, as core words. For example, the controller 130 may extract a noun and a predicate corresponding to a word in a homonym dictionary or a word in a similar pronunciation dictionary among nouns and predicates contained in the translated text as the core words.

The controller 130 may be configured to obtain image information corresponding to at least one core word with respect to the core words. For example, the controller 130 may be configured to extract a plurality of image information items corresponding to the respective core words. The controller 130 may be configured to determine relation degrees between the core words and the image information items corresponding to the core words. The controller 130 may be configured to obtain image information having a highest relation degree with a core word as the image information corresponding to the core word among the image information items corresponding to the core words. The controller 130 may be configured to determine image information that has been previously selected in order to correct the translated text as image information having a low relation degree with the corresponding core word. On the other hand, the controller 130 may be configured to determine image information that has been extracted as corrected image information, as image information having a high relation degree with the corresponding core word. The image information may include, for example, one of an image, a video, and an icon.

The controller 130 may be configured to control the communicator 110 to transmit the translated text and at least one image information item corresponding to a core word of the translated text to the user terminal 200.

In response to a command for correction of the image information being received, the controller 130 may be configured to extract at least one corrected image information item to replace image information based on the command. In response to the command for selection of the corrected image information being received, the controller 130 may be configured to correct the translated text based on the selected corrected image information. The at least one corrected image information item may, for example, be image information corresponding to a homonym or a similarly pronounced word of a core word corresponding to the selected image information.

For example, in response to the command for selection of the image information being received to correct the translated text, the controller 130 may be configured to change a parameter value of a translation model based on the command. The controller 130 may be configured to reduce a parameter value corresponding to the selected image information. In response to a command indicating that the image information is not the image information selected for correction of the translated text or that there is no error in the translated text being input to the server 100, the server 100 may increase a parameter value corresponding to the image information. According to an example embodiment, the controller 130 may be configured to store information about a probability or a score that a specific phrase is translated into a phrase of a target language and to adjust the probability or score information based on a correction command.

An example of mistranslation in the case of a homonym or a similarly pronounced word will be described in greater detail below with reference to FIGS. 3 and 4.

Statistical machine translation is not a method based on a semantic analysis result, the possibility that mistranslation occurs due to confusion between homonyms or similarly pronounced words is high. Accordingly, the controller 130 may be configured to extract a word corresponding to a homonym or to a similarly pronounced word with high possibility that mistranslation occurs as a core word. FIG. 3 is a diagram illustrating an example of mistranslation due to confusion between homonyms. For example, in response to "나는 지금 배가 고픈 것 같아" (which means that "I think I am hungry now") being received from the user terminal 200 through the communicator 110, the controller 130 may confuse "배" 310 (which refers to "stomach") with "ship" 315 instead of a stomach to generate "Now I think ship and land I" with an error resulting from statistical machine translation. In addition, in response to "밥을 많이 먹어서 배가 부르다" (which means that "I am full because I eat a lot of rice") being received from the user terminal 200 through the communicator 110, the controller 130 may confuse "배가" 320 (which means "stomach is") and "부르다" 330 (which means "full") with "doubled" 325 and "sing" 335 instead of "full" to generate "Eat a lot of rice doubled sing" with an error resulting from statistical machine translation.

FIG. 4 is a diagram illustrating an explanation of confusion between similarly pronounced words. For example, in response to "결제올립니다" 410 (which means "ask payment") being received from the user terminal 200 through the communicator 110, the controller 130 may be configured to perform statistical machine translation to generate "raise payment" 415. In addition, in response to "결재올립니다" 420 (which means "ask approval") being received from the user terminal 200 through the communicator 110, the controller 130 may perform statistical machine translation to generate "raise approval" 425. Since the "결제" 410 and the "결재" 420 are similarly pronounced but have different meanings, and in particular, when an original text is input through speech recognition, the possibility that mistranslation occurs is high. Accordingly, the controller 130 may be configured to extract a similarly pronounced word contained in the translated text as a core word to provide correction with high accuracy.

Figure 5:
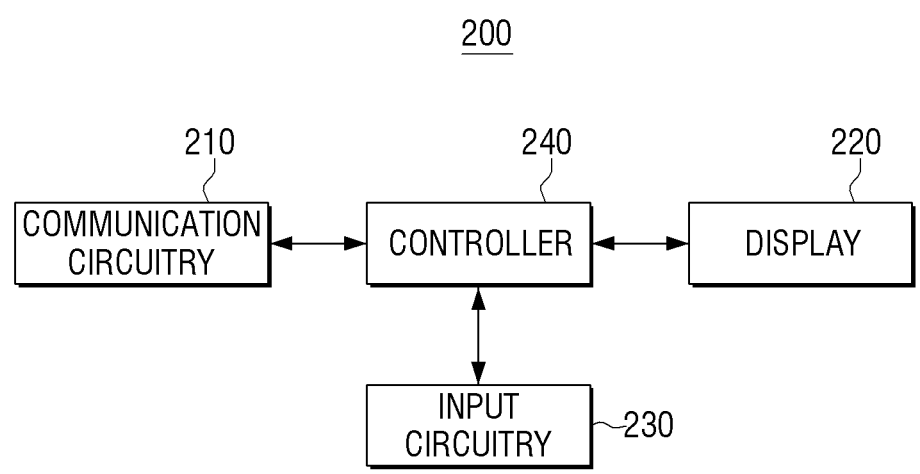
FIG. 5 is a diagram illustrating components of an example user terminal.

FIG. 5 is a diagram illustrating example components of the example user terminal 200. As illustrated in FIG. 5, the user terminal 200 may include, for example, a communicator (e.g., including communication circuitry) 210, a display 220, an inputter (e.g., including input circuitry) 230, and a controller 240. The user terminal 200 may be embodied as various electronic apparatuses such as, for example, a smart phone, a smart watch, a tablet PC, and a notebook PC, or the like.

The communicator 210 may be configured to communicate with an external apparatus. For example, the communicator 210 may be configured to transmit and receive a text and image information to and from the server 100.

The display 220 may be configured to output image data. For example, the display 220 may display the translated text received from the server and image information corresponding to a core word of the translated text.

The inputter 230 may be configured to receive a command for control of the user terminal 200. The inputter 230 may be configured to receive a voice, a text, an image, and so on. The inputter 230 may, for example, be disposed in a main body of the user terminal 200, but this is merely an example, and the inputter 230 may, for example, be disposed outside the main body (e.g., a separate microphone and keyboard). When the inputter 230 is disposed outside the main body, the inputter 230 may transmit a command signal generated through a wired/wireless interface (e.g., WiFi and Bluetooth) to the main body of the user terminal 200.

The controller 240 may be configured to control an overall operation of the user terminal 200. For example, the controller 240 may be configured to control the communicator 210 to transmit a text input through the inputter 230 to the server 100 and to receive a translated text and image information corresponding to a core word of the translated text from the server 100. The controller 240 may be configured to control the display 220 to display the received translated text and the image information corresponding to the core word of the translated text.

For example, the controller 240 may be configured to control the communicator 210 to transmit the text input through the inputter 230 to the server 100. When an original text is input through speed recognition, the controller 240 may be configured to control the communicator 210 to convert the recognized speed input into text and to transmit the text to the server 100.

The controller 240 may be configured to control the communicator 210 to receive the translated text and image information corresponding to a core word of the translated text from the server 100. The image information may, for example, be at least one of an image, a video, and an icon, or the like.

The controller 240 may be configured to control the display 220 to display the received translated text and at least one image information item corresponding to a core word of the translated text.

In addition, in response to a command for selection of the image information being input to the controller 240 in order to correct the translated text, the controller 240 may be configured to control the communicator 210 to transmit the command for selection of the image information to the server 100 and to receive at least one corrected image information item to replace the image information corresponding to the command for selection of the image information. In response to the at least one corrected image information item being received, the controller 240 may be configured to control the display 220 to display a UI including the received at least one corrected image information item. The UI including the at least one corrected image information item may include a UI element for receiving a command for determination of a core word as a word (e.g., a proper noun), which is not necessary to be translated.

In response to a command for selection of one of at least one corrected image information item being input to the controller 240, the controller 240 may be configured to control the communicator 210 to transmit the command for selection of one corrected image information item to the server 100 and to receive a corrected translated text corrected using the selected corrected image information from the server 100. In response to a command for determination of a core word as a word that is not necessary to be translated being input to the controller 240, the controller 240 may be configured to control the communicator 210 to transmit the command to the server 100, to determine a core word corresponding to the command as a proper noun or the like, and to receive the corrected translated text from the server 100. In response to the corrected translated text being received, the controller 240 may be configured to control the display 220 to display the received corrected translated text and the selected corrected image information.

By virtue of the aforementioned the user terminal 200, a translated text may be provided to a user with greater accuracy.

Figure 6:
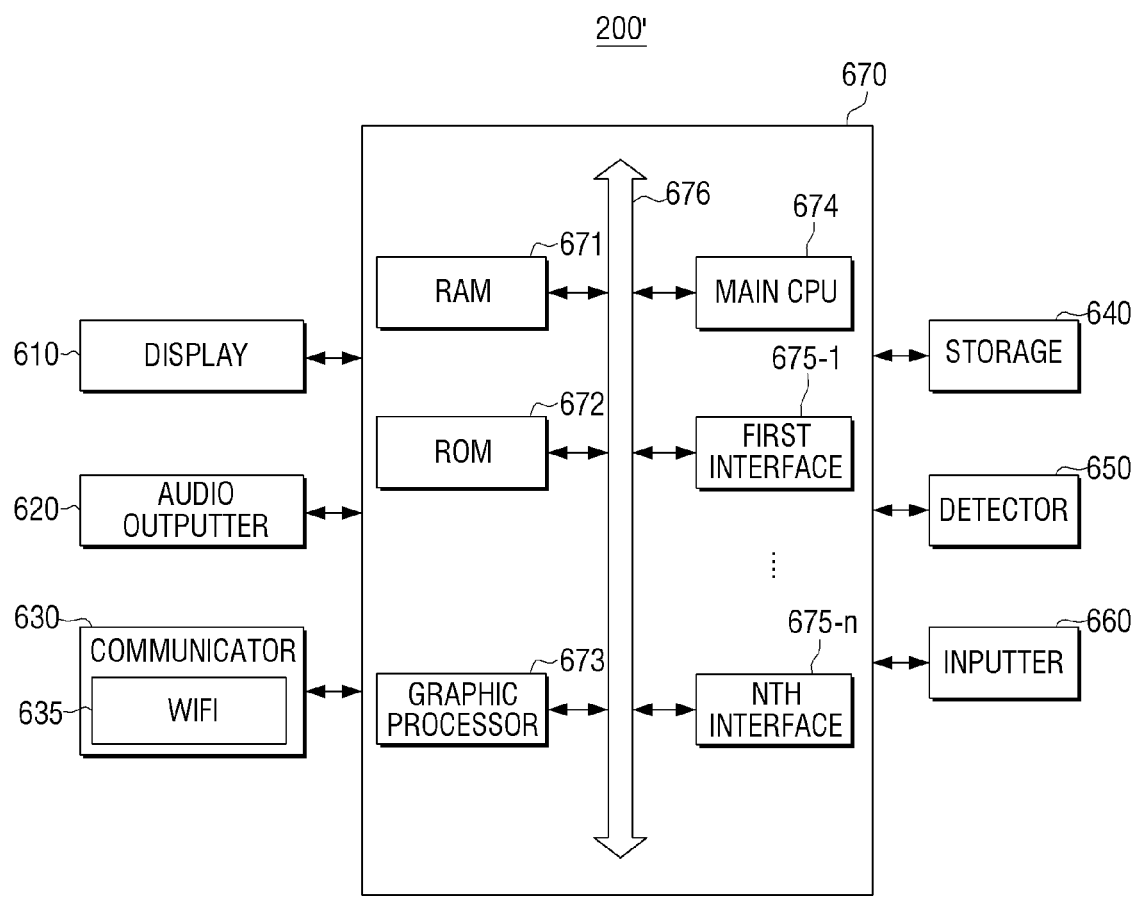
FIG. 6 is a block diagram illustrating components of an example user terminal.

Hereinafter, various examples of the disclosure will be described with reference to FIGS. 6 to 13. FIG. 6 is a block diagram illustrating example components of the user terminal 200. As illustrated in FIG. 6, the user terminal 200 may include a display 610, an audio outputter (e.g., including output circuitry) 620, a communicator (e.g., including communication circuitry) 630, a storage 640, a detector 650, an inputter (e.g., including input circuitry) 660, and a controller 670.

FIG. 6 illustrates an overall configuration of various components, for example, when the user terminal 200 is an apparatus having various functions such as a text input function and a display function. Accordingly, in some examples, some of the components illustrated in FIG. 6 may be omitted or modified or other components may be added.

The display 610 may display at least one of a video frame formed by processing image data received from an image receiver (not shown) by an image processor (not shown) and various images generated by a graphic processor 673. For example, the display 610 may display the translated text and the image information corresponding to a core of the translated text, which are transmitted and received to and from a server. In addition, the display 610 may display a UI for inputting a command for selection of image information to correct the translated text.

The audio outputter (e.g., including output circuitry) 620 may, for example, be a component for outputting various notification sounds or notification messages as well as various audio data items on which various processing operations such as decoding, amplification, and noise filtering are processed by an audio processor (not shown). According to an example embodiment, the audio outputter 620 may output the translated text via voice. For example, the audio outputter 620 may be embodied as a speaker, but this is merely an example, and thus the audio outputter 620 may be embodied as an output terminal for outputting audio data.

The communicator 630 may be a component that is configured to communicate with various types of external devices based on various types of communication methods. The communicator 630 may include, for example, various communication chips such as a WiFi chip 635, a Bluetooth chip (not shown), a near field communication (NFC) chip (not shown), and a wireless communication chip (not shown). The WiFi chip 635, the Bluetooth chip, and the NFC chip may perform communication in a WiFi manner, a Bluetooth manner, and an NFC manner, respectively. Among these, the NFC chip may, for example, refer to a chip that operates in a NFC manner using a frequency band of 13.56 MHz among various RF-ID frequency bands such as 135 kHz, 13.56 MHz, 433 MHz, 860 to 960 MHz, and 2.45 GHz. When the WiFi chip 635 or the Bluetooth chip is used, various connection information items such as an SSID and a session key may be previously transmitted and receive, communication is achieved using the connection information, and then various information items may be transmitted and received. The wireless communication chip may refer, for example, to a chip that performs communication according to various communication standards such as IEEE, ZigBee, $3^{rd}$ generation (3G), $3^{rd}$ generation partnership project (3GPP), and long term evolution (LTE), or the like.

For example, the communicator 630 may transmit and receive a text and an image to and from the server 100.

The storage 640 may store various modules for driving the user terminal 200. For example, the storage 640 may, for example, store software containing a base module, a sensing module, a communication module, a presentation module, a web browser module, and a service module (not shown). The base module may, for example, be a basic module that processes a signal transmitted from each hardware item included in the user terminal 200 and transmits the processed signal to a high layer module. The sensing module may, for example, collect information from various sensors, analyze and manage the collected information, and include a face recognition module, a speech recognition module, a motion recognition module, an NFC recognition module, and so on. The presentation module may, for example, configure a display image and include a multimedia module for reproducing and outputting multimedia content and a UI rendering module for performing UI and graphic processing. The communication module may, for example, provide communication with an external apparatus. The web browser module may, for example, perform web browsing to access a web server. The service module may, for example, include various applications for providing various services.

As described above, the storage 640 may include various program modules. However, it will be understood that some of the various program modules may be omitted or modified or other components may be added according to the type and characteristic of the user terminal 200. For example, when the aforementioned user terminal 200 is embodied as a tablet PC, the base module may further include a position determination module for determination of a GPS-based position and the sensing module may further include a sensing module for detection of an operation of a user, etc.

For example, the storage 640 may store image information corresponding to a core word of the received translated text.

According to an example embodiment, the storage 640 may be defined as including a ROM 672 or a RAM 671 in the controller 670, or a memory card (not shown) (e.g., a micro SD card and a memory stick) installed in the user terminal 200.

The detector 650 may include circuitry configured to detect a surrounding environment of the user terminal 200. For example, the detector 650 may include various sensors such as a GPS sensor for detection of positional information, a movement detection sensor (e.g., a gyro sensor and an acceleration sensor) for detection of movement of the user terminal 200, a pressure sensor, and a noise sensor, etc.

The inputter (e.g., including input circuitry) 660 may, for example, receive an original text and a command for control of the user terminal 200. For example, the inputter 660 may include various input devices such as a touch input, a button, a voice input, a motion input, a keyboard, and a mouse, or the like, in order to receive an original text and a command.

As illustrated in FIG. 6, the controller 670 may include, for example, a RAM 671, a ROM 672, the graphic processor 673, a main CPU 674, first to $n^{th}$ interfaces 675-1 to 675-n, and a bus 676. The RAM 671, ROM 672, the graphic processor 673, the main CPU 674, the first to $n^{th}$ interfaces 675-1 to 675-n, and so on may, for example, be connected to each other through a bus 676.

The ROM 672 may store a command set and so on for system booting. In response to a turn-on command being input to supply power to the main CPU 674, the main CPU 674 may copy the 0/S stored in the storage 640 to the RAM 671 and execute the 0/S to boot a system based on a command stored in the ROM 672. After the booting is completed, the main CPU 674 may copy the various application programs stored in the storage 640 to the RAM 671 and execute the application program copied to the RAM 671 to perform various operations.

The graphic processor 673 may, for example, be configured to generate an image containing various objects such as a pointer, an icon, an image, and a text using a calculator (not shown) and a renderer (not shown). The calculator may calculate an attribute value such as a coordinate value, a shape, a size, color, etc. for displaying each object according to a layout of an image using a control command received from the inputter. The renderer may generate various layouts of images including an object based on the attribute value calculated by the calculator. The image generated by the renderer may be displayed in a display region of the display 610.

The main CPU 674 may access the storage 640 and perform booting using an operating system (O/S) stored in the storage 640. In addition, the main CPU 674 may perform various operations using various programs, contents, data items, and so on which are stored in the storage 640

The first to $n^{th}$ interfaces 675-1 to 675-n may be connected to the aforementioned various components. One of the interfaces may be a network interface that is connected to an external apparatus through a network.

For example, the controller 670 may be configured to control the communicator 630 to transmit an original text input through the inputter 660 to the server 100 and to receive a translated text and image information corresponding to a core word of the translated text from the server 100. The controller 670 may be configured to control the display 610 to display the received translated text and the image information corresponding to the core word of the translated text.

For example, the controller 670 may be configured to receive an original text through the inputter 660. In response to an original text being input as voice through the inputter 660, the controller 670 may be configured to convert the input voice into text.

The controller 670 may be configured to control the communicator 630 to transmit the original text to the server 100. The controller 670 may be configured to control the communicator 630 to receive the translated text generated by translating the original text and the image information of a core word of the translated text from the server 100.

The controller 670 may be configured to control the display 610 to display the received translated text and the image information corresponding to the core word of the translated text. The image information may, for example, including at least one of an image, a video, and an icon and may refer to a core word.

Figure 7:
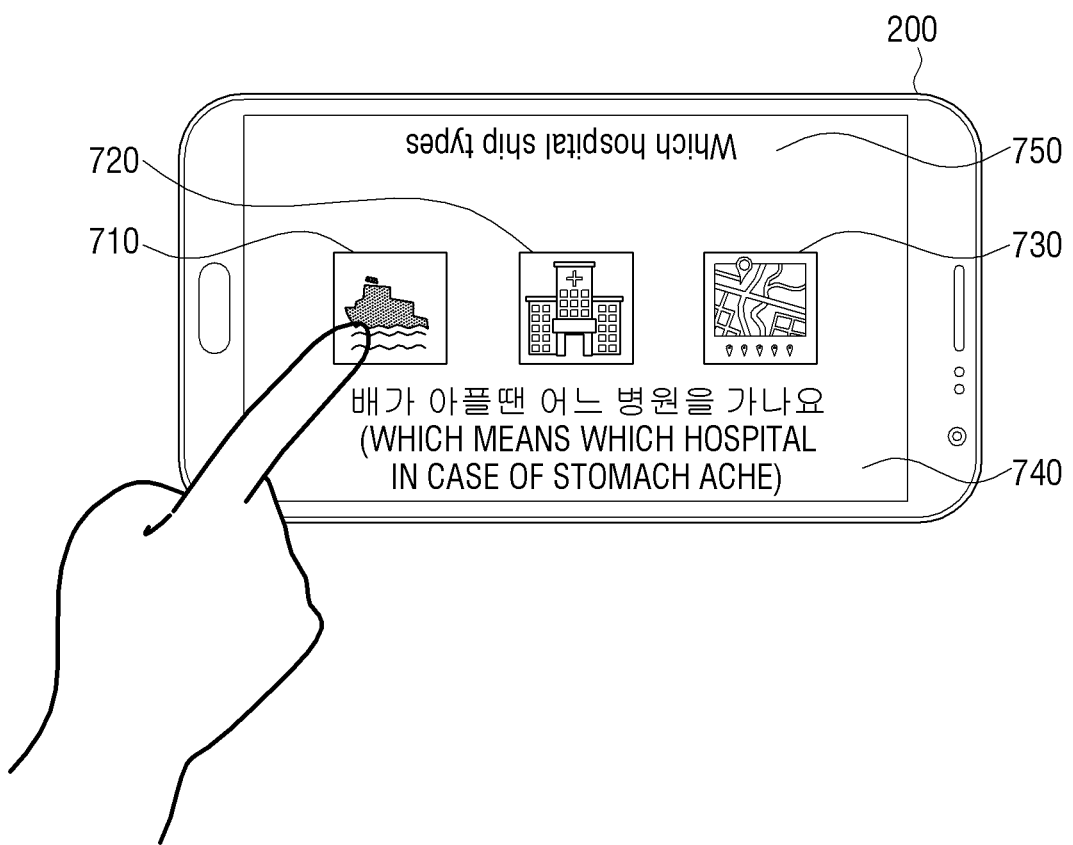
FIGS. 7 to 13 are diagrams illustrating examples of various embodiments for providing a translated text together with image information corresponding to a core word.

For example, as illustrated in FIG. 7, in response to an original text " 배가 아플 땐 어느 병원을 가나요 " 740 (which means "which hospital in case of stomach ache") being input through the inputter 660, the controller 670 may be configured to control the communicator 630 to transmit " 배가 아플 땐 어느 병원을 가나요 " 740 to the server 100. The controller 670 may be configured to control the communicator 630 to receive a translated text "Which hospital ship types" 750 generated by translating " 배가 아플 땐 어느 병원을 가나요 " 740 and a ship image 710, a hospital image 720, and a map image 730, which correspond to a core word of the translated text, from the server 100.

In addition, the controller 670 may be configured to control the display 610 to display the received "Which hospital ship types" 750 and the ship image 710, a hospital image 720, and the map image 730, which correspond to a core word of the "Which hospital ship types" 750. As illustrated in FIG. 7, the original text and image information corresponding to a core word of a translated text may be displayed, and the translated text may be line-symmetrically displayed with the displayed original text and image, but this is merely an example, and thus the translated text may be displayed with various structures.

The possibility that " 배 " (which refers to "stomach") contained in an input text " 배가 아플 땐 어느 병원을 가나요 " 740 is translated into "ship" contained in the translated text "Which hospital ship types" 750 is statistically high, but the "ship" has different meaning from the " 배 " contained in the original text " 배가 아플 땐 어느 병원을 가나요 " 740 and corresponds to a mistranslation. Even a user who does not completely know a target language may determine that mistranslation occurs through the ship image 710 having a low relation with " 배가 아플 땐 어느 병원을 가나요 " 740.

Accordingly, in response to a command for selection of a ship image 810 being input to the controller 670 in order to correct the translated text "Which hospital ship types" 750, the controller 670 may be configured to control the communicator 630 to transmit the command for selection of the ship image 810 to the server 100 and to receive at least one corrected image information to replace the ship image 810 from the server 100.

Figure 8:
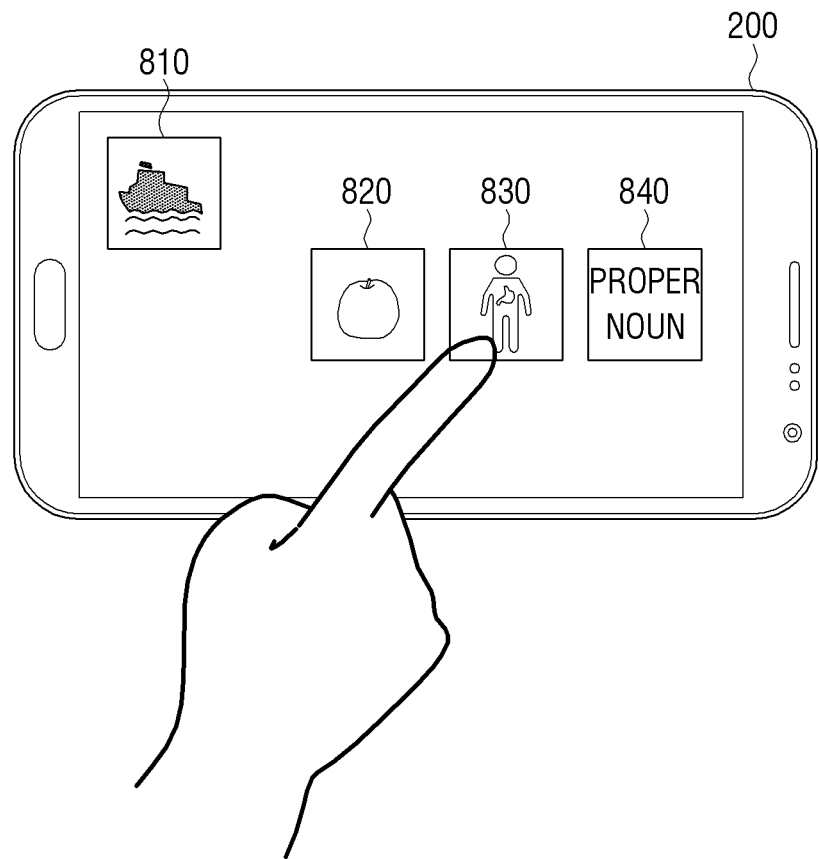

As illustrated in FIG. 8, the controller 670 may be configured to control the display 610 to display corrected images 820, 830, and 840 to replace the ship image 810. For example, the corrected images 820, 830, and 840 may include a pear image 820 and a belly image 830 which correspond, for example, to a homonym of " 배 " indicated by the selected ship image 810 and include an icon 840 indicating a proper noun which is not necessary to be translated.

In response to the belly image 830 corresponding to " 배 " of " 배가 아플 땐 어느 병원을 가나요 " 740 being selected, the controller 670 may be configured to control the communicator 630 to transmit information of the selected image 830 to the server 100 and to receive the corrected translated text based on the information of the selected image 830. In response to the icon 840 indicating a proper noun being selected, the controller 670 may be configured to control the communicator 630 to transmit the information of the selected icon 840 indicating a proper noun to the server 100, to determine " 배 " as a proper noun, and to receive a corrected translated text.

Figure 9:
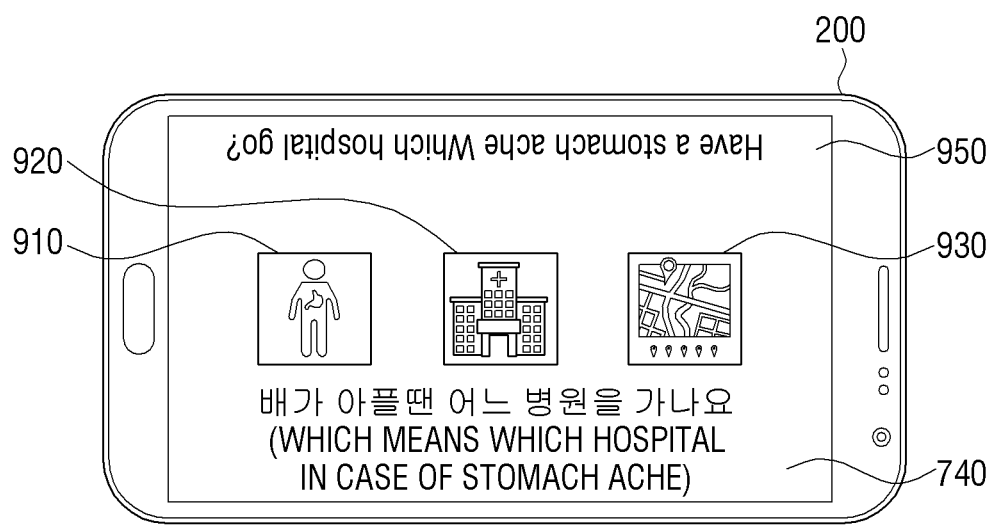

As illustrated in FIG. 9, the controller 670 may be configured to control the display 610 to display the corrected translated text "Have a stomach ache which hospital go" 950 and a belly image 910, a hospital image 920, and a map image 930, which correspond to a core word of the "Have a stomach ache which hospital go" 950. The belly image 910, the hospital image 920, and the map image 930, which correspond to the core word of the "Have a stomach ache which hospital go" 950, may be displayed together to repeatedly perform the aforementioned correction method.

Figure 10:
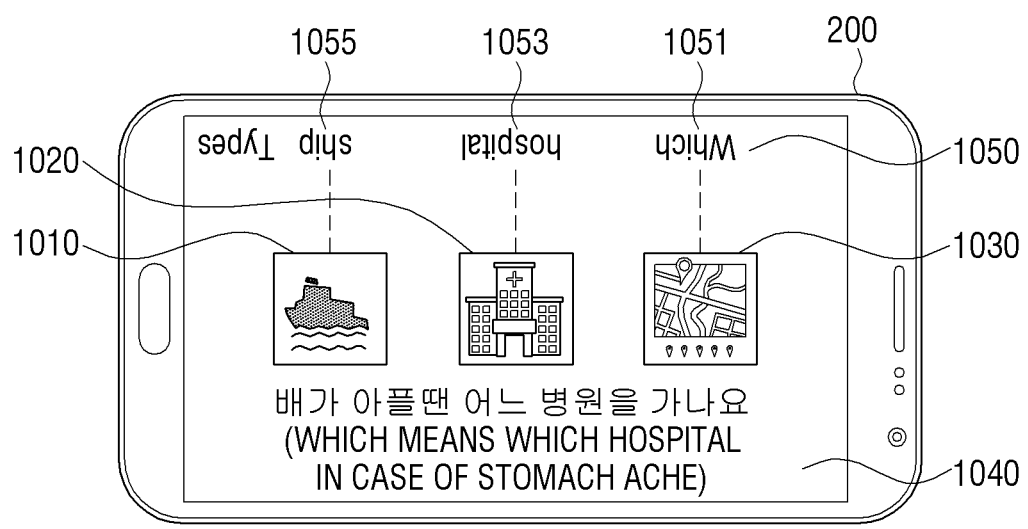

According to an example embodiment, as illustrated in FIG. 10, the controller 670 may be configured to control the display 610 to connect each core word of the translated text with corresponding image information and to display the core words. For example, the controller 670 may be configured to control the display 610 to indicate a connection line between "Which" 1051 and a map image 1030, to indicate a connection line between "hospital" 1053 and a hospital image 1020, and to indicate a connection line between "ship" 1055 and a ship image 1010 so as to connect and display respective images corresponding to core words "Which" 1051, "hospital" 1053, and "ship" 1055 of the translated text "Which hospital ship types". In addition, the controller 670 may be configured to control the display 610 to replace each core word with corresponding image information and to display the corresponding image information.

Figure 11:

According to another example embodiment, as illustrated in FIG. 11, the controller 670 may be configured to control the display 610 to display a scene 1110 of a translated text and movie subtitles corresponding to the translated text in the form of a clip. The scene 1110 of the movie subtitles corresponding to the translated text may be a scene of subtitles that are matched with the translated text by a preset percentage or more. When there are a plurality of subtitles that are matched with the translated text by a preset percentage or more, the controller 670 may be configured to control the display 610 to simultaneously display scene start images of the subtitles so as to receive a command for selection and reproduction of one subtitles scene. The controller 670 may be configured to control the communicator 630 to receive the scene 1110 of movie subtitles corresponding to the translated text from the server 100 and extract or obtain the scene 1110 of movie subtitles corresponding to the translated text among movie subtitles stored in the storage 640.

Figure 12:
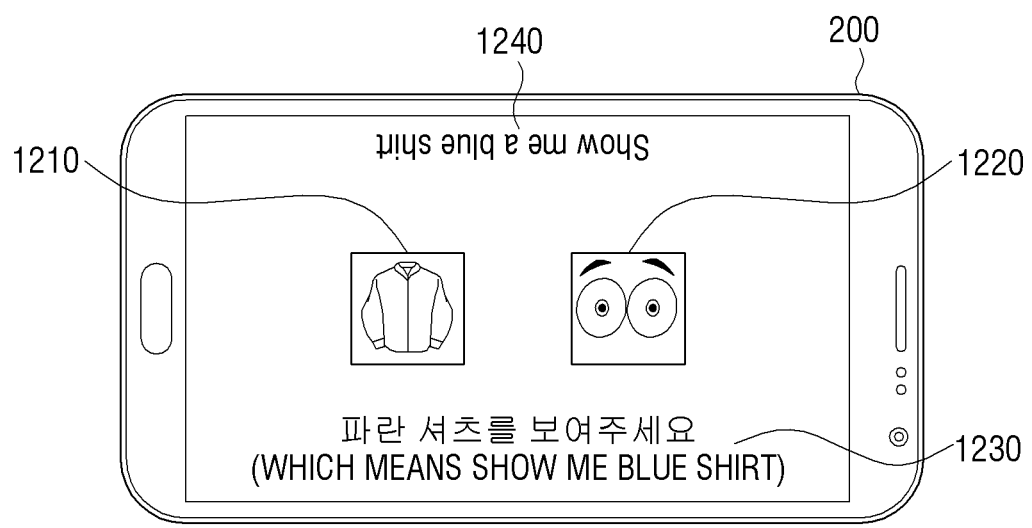
Figure 13:
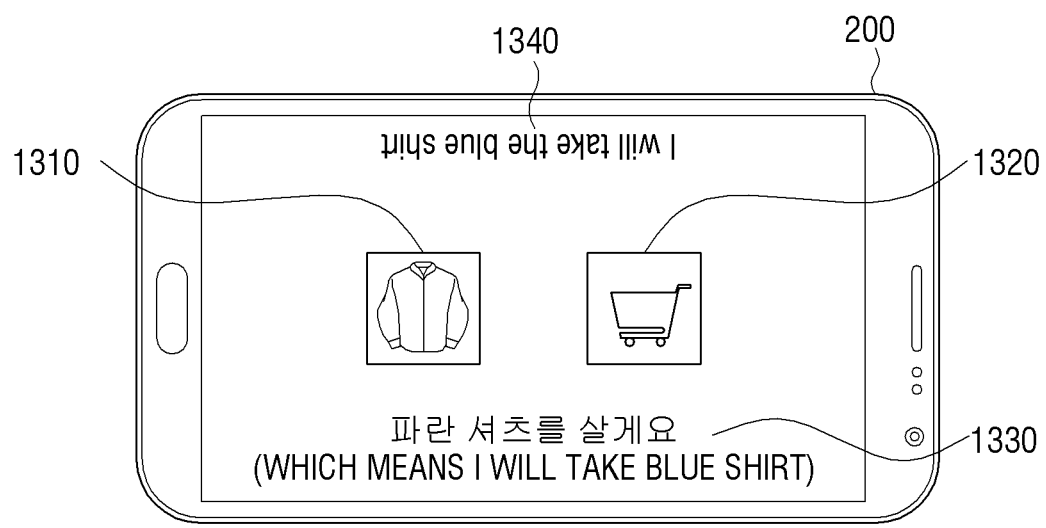

According to another example embodiment, as illustrated in FIGS. 12 and 13, in response to a command for replacing one or more image information items corresponding to a core word of the translated text being input to the controller 670, the controller 670 may be configured to control the communicator 630 to transmit the command and to receive the replaced image information. For example, the controller 670 may receive " 파란 셔츠를 보여주세요 " 1230 (which means "show me blue shirt") through the inputter 660. In addition, the controller 670 may be configured to control the communicator 630 to transmit " 파란 셔츠를 보여주세요 " 1230 to the server 100 and to receive "Show me a blue shirt" 1240 and a blue shirt image 1210 and a two-eye image 1220, which correspond to a core word of "Show me a blue shirt" 1240. In addition, the controller 670 may be configured to control the display 610 to display "Show me a blue shirt" 1240 and the blue shirt image 1210 and the two-eye image 1220, which correspond to the core word of "Show me a blue shirt" 1240.

In response to a command for replacing the two-eye image 1220 corresponding to "보여주세요" (which means "Show") being input to the controller 670, the controller 670 may be configured to control the communicator 630 to transmit information about the two-eye image 1220 to the server 100 and to receive replacement image information. The replaced image information for replacing the two-eye image 1220 may be image information indicating the meaning of "I will take", "How much", and so on.

In response to a command for selection of a cart image 1320 indicating the meaning of "I will take" being input to the controller 670, the controller 670 may be configured to control the communicator 630 to transmit information about the cart image 1320 to the server 100 and to receive a corrected translated text based on the cart image 1320. As illustrated in FIG. 13, the controller 670 may be configured to control the display 610 to display an original text " 파란 셔츠를 살게요 " 1330 (which means "I will take the blue shirt"), a corrected translated text "I will take the blue shirt" 1340, a blue shirt image 1310, and the cart image 1320.

Figure 14:
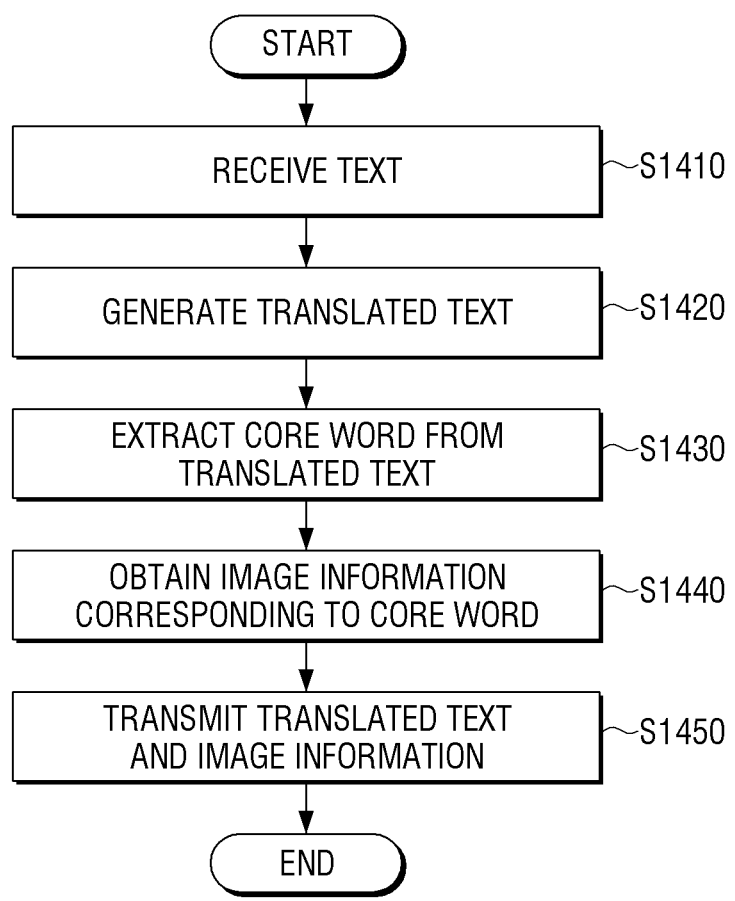
FIGS. 14 and 15 are flowcharts illustrating example methods for controlling a server.

An example method for controlling the server 100 will be described with reference to FIG. 14.

The server 100 may receive an original text from the user terminal 200 (S1410).

The server 100 may translate the original text to generate a translated text (S1420). For example, the server 100 may translate the received original text based on a parameter value of a translation model to generate the translated text.

The server 100 may extract a core word of the translated text (S1430). For example, a noun, a predicate, and so on of the translated text may be extracted as a core word. For example, the server 100 may extract a noun, a predicate, and so on, corresponding to a homonym or similarly pronounced word among nouns and predicates of the translated text as a core word.

The server 100 may obtain image information corresponding to the extracted core word (S1440). In this case, the image information may, for example, be one of an image, a video, and an icon and may be pre-stored image information or searched for from outside (e.g., the Internet).

The server 100 may transmit the translated text and image information corresponding to a core word of the translated text to the user terminal 200 (S1450).

Figure 15:
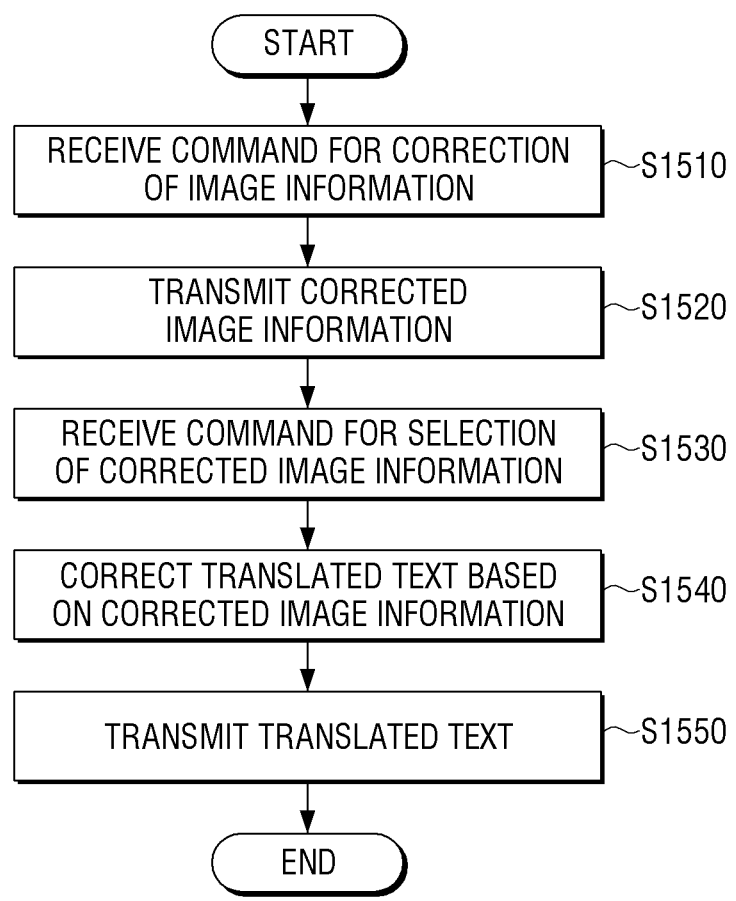

An example method for controlling the server 100 for correction of a translated text will be described with reference to FIG. 15.

The server 100 may receive a command for correction of image information (S1510).

The server 100 may obtain corrected image information to be replaced with image information corresponding to the command. In addition, the server 100 may transmit the corrected image information to the user terminal 200 (S1520). For example, the server 100 may obtain image information of a homonym or similarly pronounced word of a word indicated by the image information corresponding to the command as the corrected image information.

Upon a command for selection of the corrected image information being received from the user terminal 200 (S1530), the server 100 may correct the translated text based on the corrected image information (S1540).

The server 100 may transmit the corrected translated text to the user terminal 200 (S1550).

An example method for controlling the translation system 10 will be described with reference to FIG. 16.

The user terminal 200 may receive an original text (S1605). The user terminal 200 may receive an original text as a text, voice, or the like. In response to the original text being input to the user terminal 200, the user terminal 200 may transmit the input text to the server 100 (S1610).

In response to the input text being received, the server 100 may translate the input text to generate the translated text (S1615). For example, the server 100 may translate the original text received based on a parameter value of a translation model to generate a translated text.

The server 100 may extract a core word of the translated text (S1620). For example, a noun, a predicate, and so on of the translated text may be extracted as a core word. For example, the server 100 may extract a noun, a predicate, and so on, corresponding to a homonym or similarly pronounced word among nouns and predicates of the translated text as a core word.

The server 100 may obtain image information corresponding to the extracted core word (S1625). In this case, the image information may be one of an image, a video, and an icon, or the like, and may be pre-stored image information or searched for from outside (e.g., the Internet).

The server 100 may transmit the translated text and image information corresponding to a core word of the translated text to the user terminal 200 (S1630).

In addition, the user terminal 200 may display the received translated text and image information corresponding to the core word of the translated text. In response to a command for selection of the image information being input in order to correct the translated text (S1635), the user terminal 200 may transmit the command for selection of the image information to the server 100 (S1640).

In response to the command for selection of the image information being received, the server 100 may obtain corrected image information to be replaced with the selected image information (S1645). For example, the server 100 may obtain image information of a word corresponding to a homonym or similarly pronounced word of a word indicated by the selected image information. The server 100 may transmit the extracted corrected image information to the user terminal 200 (S1650).

The user terminal 200 may display a UI containing the received corrected image information and receive a command for selection of the corrected image information (S1655). The user terminal 200 may transmit the command for selection of the corrected image information to the server 100 (S1660).

In response to the command for selection of the corrected image information being received, the server 100 may correct the translated text based on the selected corrected image information (S1665) and transmit the corrected translated text to the user terminal 200 (S1670).

The user terminal 200 may display the corrected translated text and the corrected image information (S1675). In response to the command for selection of the corrected image information being input, the aforementioned correction method may be repeatedly performed.

According to the aforementioned various examples of the disclosure, a user may receive a translated text that is more accurate when the user does not know a target language.

The examples of the disclosure may be written as computer programs and may be implemented in general-use digital computers that execute the programs stored, for example, on a non-transitory computer readable recording medium. In addition, a structure of data used in the above-described method may be recorded in a computer readable recording medium through various methods. Examples of the computer readable recording medium include storage media such as magnetic storage media (e.g., ROMs, floppy disks, hard disks, etc.) and optical recording media (e.g., CD-ROMs, or DVDs.

The foregoing example embodiments and advantages are merely examples and are not to be construed as limiting the disclosure. The teachings can be readily applied to other types of apparatuses. The description of the example embodiments is intended to be illustrative, and not to limit the scope of the claims, and many alternatives, modifications, and variations will be apparent to those skilled in the art.

What is claimed is:

1. A method of controlling a server, the method comprising:
    receiving a sentence and information about a target language from a user terminal;
    translating the sentence into the target language to obtain a translated sentence;
    extracting a core word from the translated sentence;
    obtaining image information corresponding to the core word;
    transmitting the translated sentence and the image information to the user terminal,
    in response to receiving a first command for correction of the image information from the user terminal, transmitting at least one corrected image information item corresponding to the first command, said at least one corrected image information item for replacing at least one obtained image information,
    in response to receiving a second command for selection of the corrected image information from the user terminal, correcting the translated sentence based on the selected corrected image information; and
    transmitting the corrected translated sentence to the user terminal;
    in response to receiving a third command for obtaining a content corresponding to the corrected translated sentence from the user terminal, obtaining content information based on the translated sentence; and
    transmitting the content information to the user terminal; and
    wherein the content information includes time information of a scene corresponding to the corrected translated sentence.

2. The method as claimed in claim 1, wherein the content information further comprises address information of the content or the content itself.

3. The method as claimed in claim 1, wherein the obtaining image information corresponding to the core word comprises obtaining the content information including a subtitle matching at least a predetermined percentage with the translated sentence.

4. The method as claimed in claim 3, further comprising:
    in response to a plurality of subtitles that match at least a predetermined percentage with the translated sentence, transmitting information on a plurality of contents corresponding to the plurality of subtitles.

5. A server comprising:
    communication circuitry;
    a controller configured to:
        control the communication circuitry to receive a sentence and information about a target language from a user terminal,
        translate the sentence into the target language and obtain a translated sentence,
        extract a core word from the translated sentence;
        obtain image information corresponding to the cord word;
        transmit the translated sentence and the image information to the user terminal,
        in response to receiving a first command for correction of the image information from the user terminal, control the communication circuitry to transmit at least one corrected image information item corresponding to the first command, said at least one corrected image information item for replacing at least one obtained image information,
        in response to receiving a second command for selection of the corrected image information from the user terminal, correct the translated sentence based on the selected corrected image information; and
        control the communication circuitry to transmit the corrected translated sentence to the user terminal;
        in response to receiving a third command for obtaining a content corresponding to the corrected translated sentence from the user terminal, obtain content information based on the translated sentence, and
        control the communication circuitry to transmit the content information,
    wherein the content information includes time information of a scene corresponding to the translated sentence.

6. The server as claimed in claim 5, wherein the content information further comprises address information of the content or the content itself.

7. The server as claimed in claim 5, wherein, while obtaining the image information corresponding to the core word, the controller obtains the content information including a subtitle matching at least a predetermined percentage with the translated sentence.

8. The server as claimed in claim 7, wherein the controller, in response to a plurality of subtitles that match at least a predetermined percentage with the translated sentence, controls the communication circuitry to transmit information on a plurality of contents corresponding to the plurality of subtitles.

* * * * *